US009452931B2

(12) United States Patent
Paul et al.

(10) Patent No.: US 9,452,931 B2
(45) Date of Patent: Sep. 27, 2016

(54) PROCESS SCHEME FOR CATALYTIC PRODUCTION OF RENEWABLE HYDROGEN FROM OXYGENATE FEEDSTOCKS

(71) Applicant: PHILLIPS 66 COMPANY, Houston, TX (US)

(72) Inventors: Uchenna P. Paul, Bartlesville, OK (US); Bruce B. Randolph, Bartlesville, OK (US); Jon M. Nelson, Bartlesville, OK (US); Kristi A. Fjare, Bartlesville, OK (US); Danielle K. Smith, Bartlesville, OK (US); Mark Rumel Cragun, Bartlesville, OK (US); Richard D. Sadok, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 0 days.

(21) Appl. No.: 14/076,321

(22) Filed: Nov. 11, 2013

(65) Prior Publication Data
US 2014/0134099 A1 May 15, 2014

Related U.S. Application Data

(60) Provisional application No. 61/726,858, filed on Nov. 15, 2012.

(51) Int. Cl.
*C01B 3/32* (2006.01)

(52) U.S. Cl.
CPC ....... *C01B 3/323* (2013.01); *C01B 2203/0233* (2013.01); *C01B 2203/043* (2013.01); *C01B 2203/0405* (2013.01); *C01B 2203/0415* (2013.01); *C01B 2203/1041* (2013.01); *C01B 2203/1058* (2013.01); *C01B 2203/1076* (2013.01); *C01B 2203/1082* (2013.01); *C01B 2203/1094* (2013.01); *C01B 2203/1211* (2013.01); *C01B 2203/1217* (2013.01); *C01B 2203/1223* (2013.01); *C01B 2203/1229* (2013.01)

(58) Field of Classification Search
CPC .............. C01B 2203/0233; C01B 2203/0405; C01B 2203/0415; C01B 2203/043; C01B 2203/1041; C01B 2203/1058; C01B 2203/1076; C01B 2203/1082; C01B 2203/1094; C01B 2203/1211; C01B 2203/1217; C01B 2203/1223; C01B 2203/1229
See application file for complete search history.

(56) References Cited

U.S. PATENT DOCUMENTS

| 4,124,628 A | 11/1978 | McRobbie |
| 4,338,292 A | 7/1982 | Duranleau |

(Continued)

OTHER PUBLICATIONS

R. Krishna, "Reactive Separations: More Ways to Skin a Cat", Chemical Engineering Science 57, 2002, pp. 1491-1504.

(Continued)

*Primary Examiner* — Stanley Silverman
*Assistant Examiner* — Syed Iqbal
(74) *Attorney, Agent, or Firm* — Phillips 66 Company (57) ABSTRACT

A process is described for flowing an oxygenate feed over a catalyst in an adiabatic fixed bed reactor to product a reactor effluent and heat. The reaction inside the adiabatic fixed bed reactor occurs at a reaction temperature from about 200° C. to about 375° C. The reactor effluent is then condensed to separate the liquid products and the gaseous products. A separation step then separates the gaseous products into hydrogen and off-gas.

15 Claims, 9 Drawing Sheets

(56) References Cited

U.S. PATENT DOCUMENTS

| | | | |
|---|---|---|---|
| 4,456,779 A | 6/1984 | Owen et al. | |
| 4,876,409 A | 10/1989 | Leyshon et al. | |
| 5,869,011 A | 2/1999 | Lee | |
| 6,699,457 B2* | 3/2004 | Cortright et al. | 423/648.1 |
| 7,998,455 B2 | 8/2011 | Abbas et al. | |
| 2004/0081614 A1 | 4/2004 | Ying et al. | |
| 2004/0137288 A1* | 7/2004 | Morgenstern | 429/17 |
| 2006/0248800 A1 | 11/2006 | Miglin et al. | |
| 2007/0140954 A1* | 6/2007 | Tio | 423/650 |
| 2009/0320370 A1* | 12/2009 | Fecteau et al. | 48/199 R |
| 2010/0051874 A1 | 3/2010 | O'Connor et al. | |
| 2011/0177410 A1 | 7/2011 | Assink et al. | |
| 2011/0309000 A1 | 12/2011 | Tanaka et al. | |

OTHER PUBLICATIONS

PCT Notification of Transmittal of the International Search Report and the Written Opinion of the International Searching Authority, or the Declaration, International Application No. PCT/US13/69398, International Filing Date: Nov. 11, 2013, 14 pages.

* cited by examiner

PROCESS SCHEME FOR CATALYTIC PRODUCTION OF RENEWABLE HYDROGEN FROM OXYGENATE FEEDSTOCKS

CROSS-REFERENCE TO RELATED APPLICATIONS

This application is a non-provisional application which claims the benefit of and priority to U.S. Provisional Application Ser. No. 61/726,858 filed Nov. 15, 2012, entitled "Process Scheme for Catalytic Production of Renewable Hydrogen from Oxygenate Feedstocks," which is hereby incorporated by reference in its entirety.

STATEMENT REGARDING FEDERALLY SPONSORED RESEARCH OR DEVELOPMENT

None.

FIELD OF THE INVENTION

This invention relates a process for the catalytic production of renewable hydrogen.

BACKGROUND OF THE INVENTION

Steam reforming of single or multi-component oxygenated feeds could be a viable source of low-carbon hydrogen in the future. Different approaches have been attempted but each has challenges.

One way of generating hydrogen from an oxygenate-containing feed has been to use conventional steam methane reforming technology but to operate at very high temperatures. These temperatures range from 700° C. to about 900° C. However there are disadvantages of operating the steam methane reformer at these high temperatures, such as shorter catalyst lifetime, high capital costs and energy costs due to the high heat involved. Typically this heat is provided by burning natural gas, which produces $CO_2$.

Another method of generating hydrogen has been to use noble metal catalysts such as platinum, palladium and rhodium. By using these noble metal catalysts extreme high temperatures can be avoided; however, the economics of the process can be prohibitively expensive and the processes often require additional external fuel sources or high-pressure steam because of reduced methane and carbon monoxide yields.

Yet another method proposed for generating hydrogen from bio-derived ethanol is to operate the reformer at supercritical water conditions over Ni-based catalysts. However, the very high energy intensity along with expensive metallurgy and fabrication costs required for supercritical reforming of bioethanol due to the very high pressures (>3000 psi) and temperatures greater than 500° C. makes the process less practical at commercial scale.

BRIEF SUMMARY OF THE DISCLOSURE

A process is disclosed for flowing an oxygenate-containing feed over a catalyst in an adiabatic fixed bed reactor to produce a reactor effluent and heat. The reaction inside the adiabatic fixed bed reactor occurs at a reaction temperature from about 200° C. to about 375° C. The reactor effluent is then condensed to separate the liquid products and the gaseous products. A separation step then separates the gaseous products into hydrogen and off-gas.

A process is disclosed for mixing organic oxygenates with water to produce an oxygenate feed. The oxygenate feed is then flowed over an adiabatic fixed bed reactor containing a metal catalyst to produce reactor effluent and heat. The reaction inside the adiabatic fixed bed reactor occurs at a reaction temperature from about 200° C. to about 375° C. The heat from the reaction is used to maintain the reaction temperature inside the adiabatic fixed bed reactor. The reactor effluent is then condensed to separate the liquid products and the gaseous products. The liquid products then recycle back to be mixed into the oxygenate feed stream. A separation step then separates the gaseous products into hydrogen and off-gas.

A process is disclosed for mixing organic oxygenates with water to produce an oxygenate feed. The oxygenate feed then flows over an adiabatic fixed bed reactor containing a metal catalyst to produce a reactor effluent and heat. The reaction inside the adiabatic fixed bed reactor occurs at a reaction temperature from about 200° C. to about 375° C. The heat from the reaction is used to maintain the reaction temperature inside the adiabatic fixed bed reactor. The reactor effluent is then condensed to separate the liquid products and the gaseous products. The liquid products then recycle back to the oxygenate feed stream. A separation step then separates the gaseous products into hydrogen and off-gas. The off-gas is then split into two portions. A portion of the off-gas is reacted in a conventional steam methane reformer to produce more hydrogen. A second portion of the off-gas is used to generate heat to maintain the reaction temperature inside the adiabatic fixed bed reactor.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

A process is disclosed for flowing an oxygenate feed over an adiabatic fixed bed reactor to produce a reactor effluent and heat. The reaction inside the adiabatic fixed bed reactor occurs at a reaction temperature from about 200° C. to about 375° C. The reactor effluent is then condensed to separate the liquid products and the gaseous products. A separation step then separates the gaseous products into hydrogen and off-gas.

Figure 1:
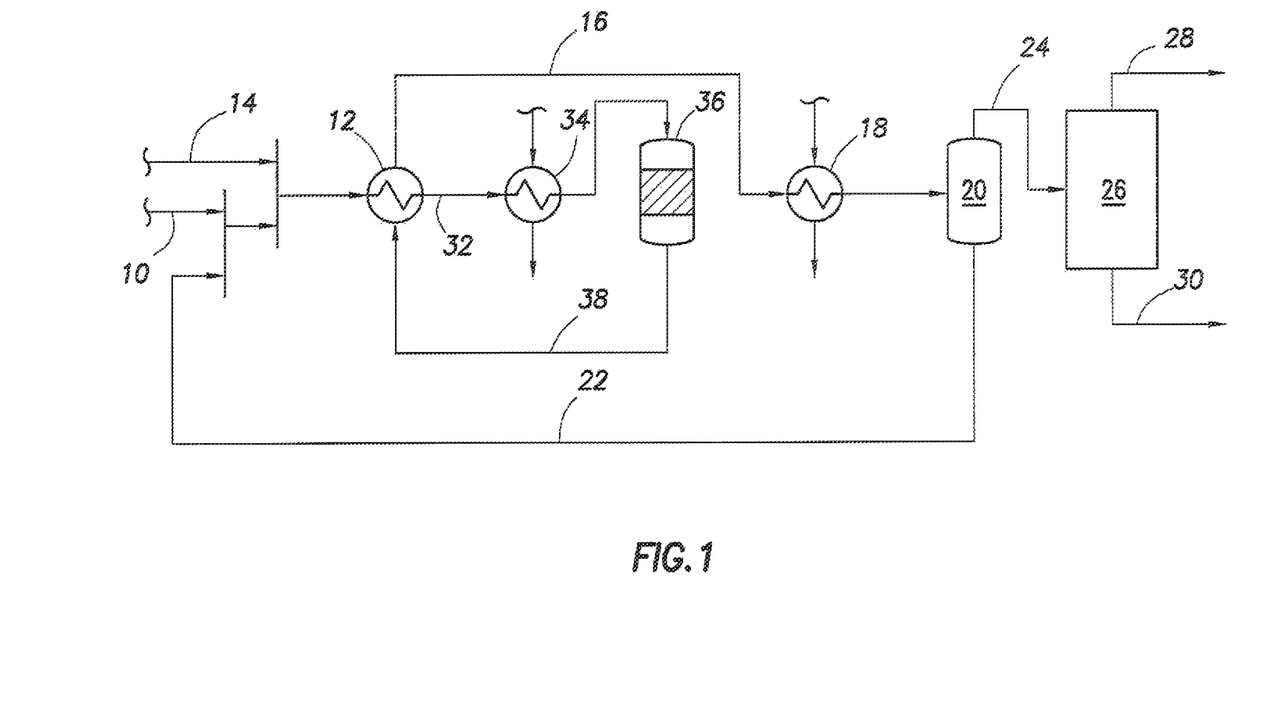
FIG. 1 depicts one embodiment of the process.

As shown in FIG. 1, an oxygenate feed 10 can flow into the adiabatic fixed bed reactor 36. The oxygenate feed used can be any compounds that contain oxygen as part of their chemical structure. In one embodiment, the oxygenate feed used in this process can be from any biomass or biomass-derived stream. As an example, different sources of the oxygenates include corn fiber/stover derived aqueous streams, and streams or fractions derived from lignin, lignocellulosic biomass, and algae.

As shown in FIG. 1, water 14 can optionally be added to the oxygenate feed 10 prior to flowing into the adiabatic fixed bed reactor 36. In some embodiments the amount of water added is dependent upon the desired steam to carbon ratio for the reaction, preferably 1.0 to 10.0.

In one embodiment the reaction inside the adiabatic fixed bed reactor 36 can occur with a metal catalyst. Examples of metal catalysts that can be used include: gold, copper, lead, nickel, zinc, iron, steel, aluminium, tin, tungsten, molybdenum, tantalum, cobalt, bismuth, cadmium, titanium, zirconium, antimony, manganese, beryllium, chromium, germanium, vanadium, gallium, hafnium, indium, niobium, rhenium, thallium and combinations thereof. In another embodiment types of metal catalysts include: Au, Ni, Cu, Fe, K, MgO, $CeO_2$, $Al_2O_3$ and combinations thereof. As an example, a metal catalyst comprising x % Ni, y % Cu, z % Fe, xx % K, yy % MgO, zz % $CeO_2$ and XXX % $Al_2O_3$ can be utilized where x ranges from 0 to 30 wt %, y ranges from 0 to 20 wt %; z ranges from 0 to 20 wt %; xx ranges from 0 to 20 wt %; yy ranges from 0 to 20 wt %; zz ranges from 0 to 20 wt %; and xxx ranges from 20 to 90 wt %. As yet another example the catalyst can comprise 26 wt % Ni, 10 wt % Cu, 10 wt % MgO, and 54 wt % $Al_2O_3$ or can comprise 26 wt % Ni, 10 wt % Cu, 1 wt % K, 10 wt % $CeO_2$, and 53 wt % $Al_2O_3$. Additionally, the catalyst can be supported on any commonly known support known to those skilled in the art. In one embodiment the support is an inexpensive alumina support.

The reaction inside the adiabatic fixed bed reactor occurs at a temperature range from 200° C. to about 375° C., or from 275° C. to about 325° C. The pressure inside the adiabatic fixed bed reactor can be 100 to 500 psig and gas-hourly space velocities (GHSV) can range from 100 to 7000 per hour.

The reactor effluent 16 produced from the adiabatic fixed bed reactor 36 can flow to a condenser 18 to condense the reactor effluent so that it can be separated by a separator 20 into liquid products 22 and the gaseous products 24.

In one embodiment the liquid products 22 are returned back to the oxygenate feed 10 to be put through the process once again.

In another embodiment the gaseous products 24 are flowed through a separation step 26 that separates the gaseous products into hydrogen 28 and off-gas 30. The separation step 26 can occur with a pressure swing absorber, a membrane separator, or liquid-phase solvents.

In one embodiment the hydrogen produced from the separation step has a purity of at least 90%, 95%, 99% or even 100%. The off-gas produced from the separation step can contain high concentrations of CO, $CH_4$ and $CO_2$.

The heat 38 from the reactor 36 is recovered by exchanging it with the mixed-feed stream in a feed-effluent heat exchanger 12. This heat exchange results in a temperature increase of 50 to 250° C. for stream 32. The additional heat required to increase the feed temperature to the reaction temperature is supplied through heat-exchange with a high-pressure stream in heat-exchanger 34.

Figure 2:
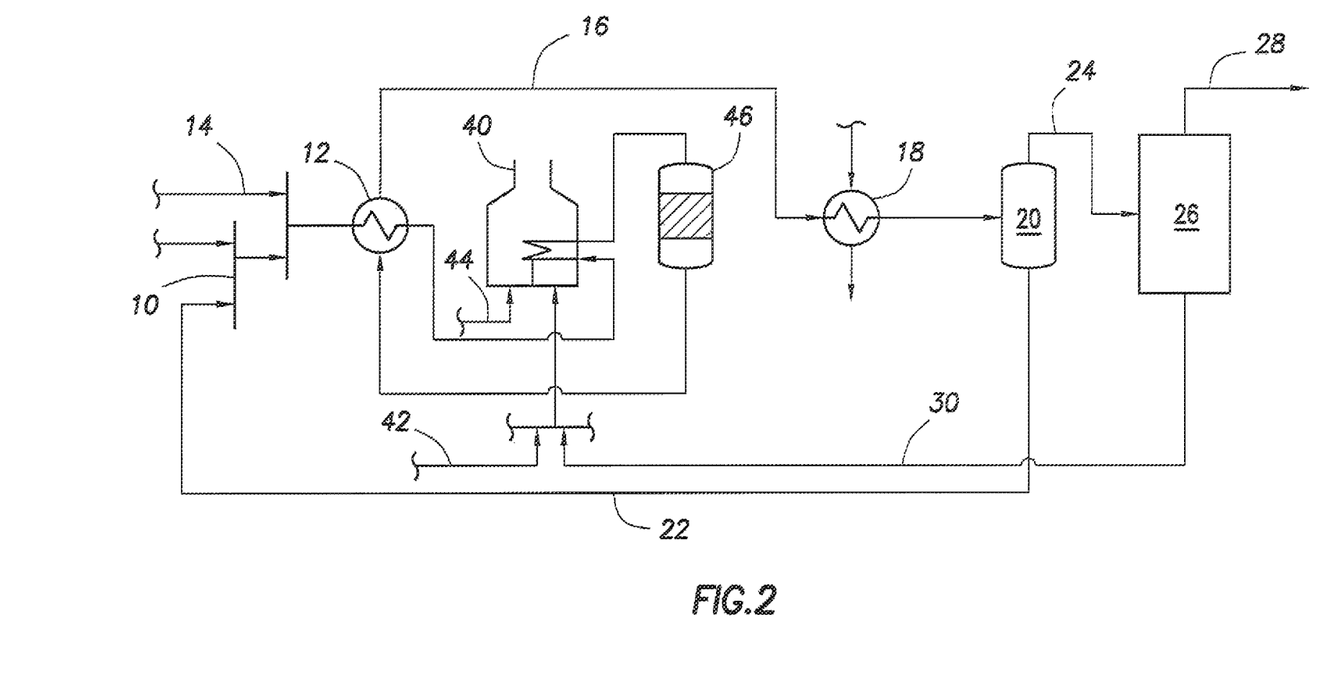
FIG. 2 depicts one embodiment of the process.

FIG. 2 depicts a variation to FIG. 1, wherein the additional heat needed for the reaction after the feed-effluent exchanger is supplied by flowing the pre-heated feed through a fired heater 40. As shown in FIG. 2, the heater 40 can have fuel inputs of the off-gas 30 in addition to any make-up renewable fuel or natural gas 42. If required, air 44 can also be added to the heater 40

Figure 3:
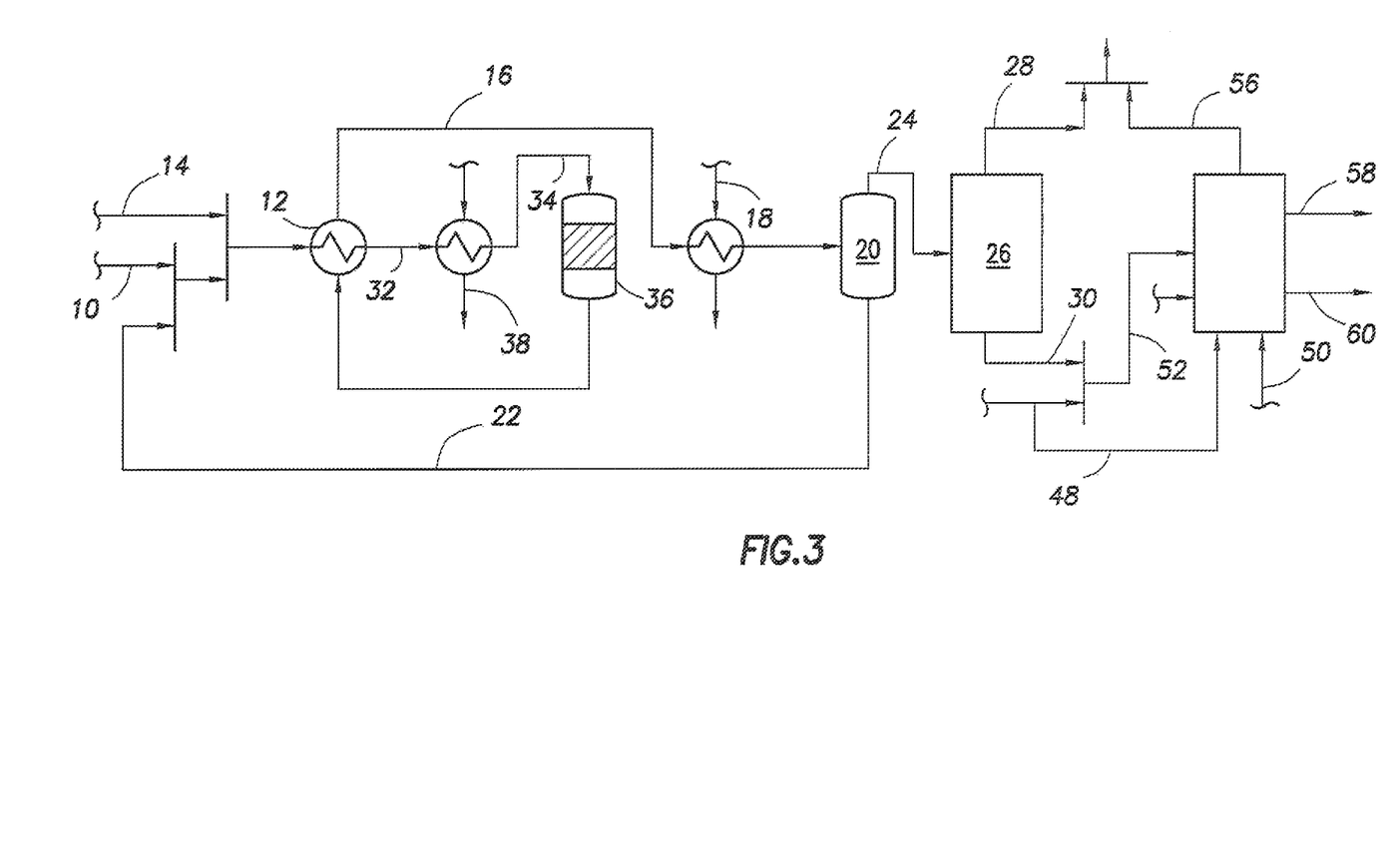
FIG. 3 depicts one embodiment of the process.

Alternatively, FIG. 3 depicts yet another variation to FIG. 1, wherein the off-gas 30 from the separator 20 is combined with natural gas 48, air 50 and water 52 inside a conventional steam methane reformer 54 to produce additional hydrogen 56, flue gas 58 and a high pressure stream 60.

Figure 4:
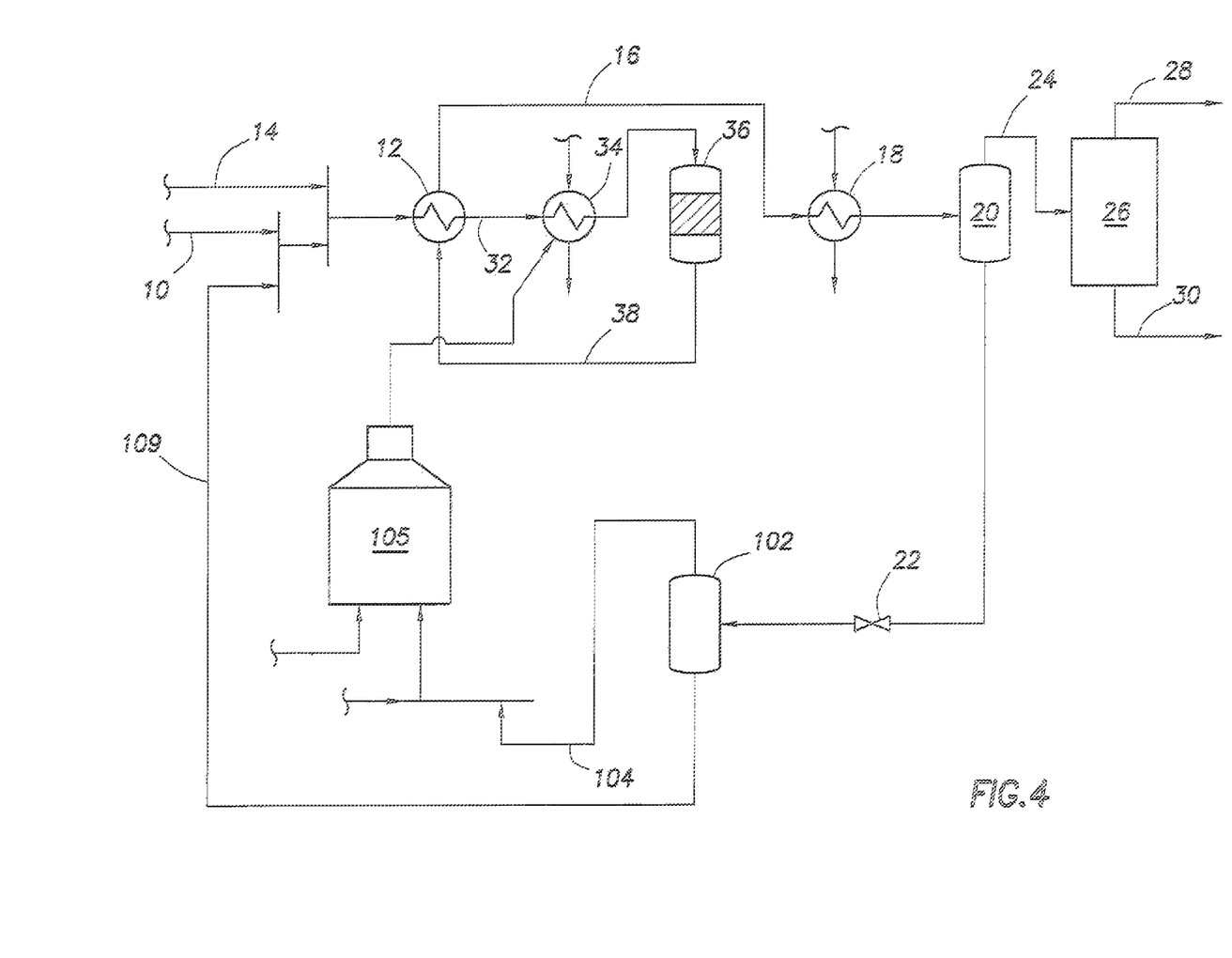
FIG. 4 depicts one embodiment of the process.

In yet another embodiment, FIG. 4 depicts another variation to FIG. 1, wherein the liquid products 22 stream is flashed in device 102 to product 109 and a fuel gas steam 104. Any conventionally known device or combination of devices can be used in 102 to flash the liquid products 22 into the fuel gas stream 104. This fuel gas stream 104 can then be combusted in the furnace 105 along with make-up fuel and can be directly utilized anywhere in the process to lower the amount of operating fuel and costs needed to operate this process. In one example the heated gas stream 104 can be utilized in the heat exchanger of 34, or (not currently shown) the adiabatic fixed bed reactor 36. The bottom stream 109 from the flash device 102 can be recycled and mixed with the oxygenates stream 10. Although not shown it is also feasible that the liquid product stream 22 is split into two different streams wherein one stream continues to flow to the oxygenates 10 and the second stream flows towards the device 102 used to flash the liquid products 22.

Any variation of the above mentioned figures can be used as a process to create renewable hydrogen from an oxygenate feed.

The following examples of certain embodiments of the invention are given. Each example is provided by way of explanation of the invention, one of many embodiments of the invention, and the following examples should not be read to limit, or define, the scope of the invention.

Example 1

Figure 5:
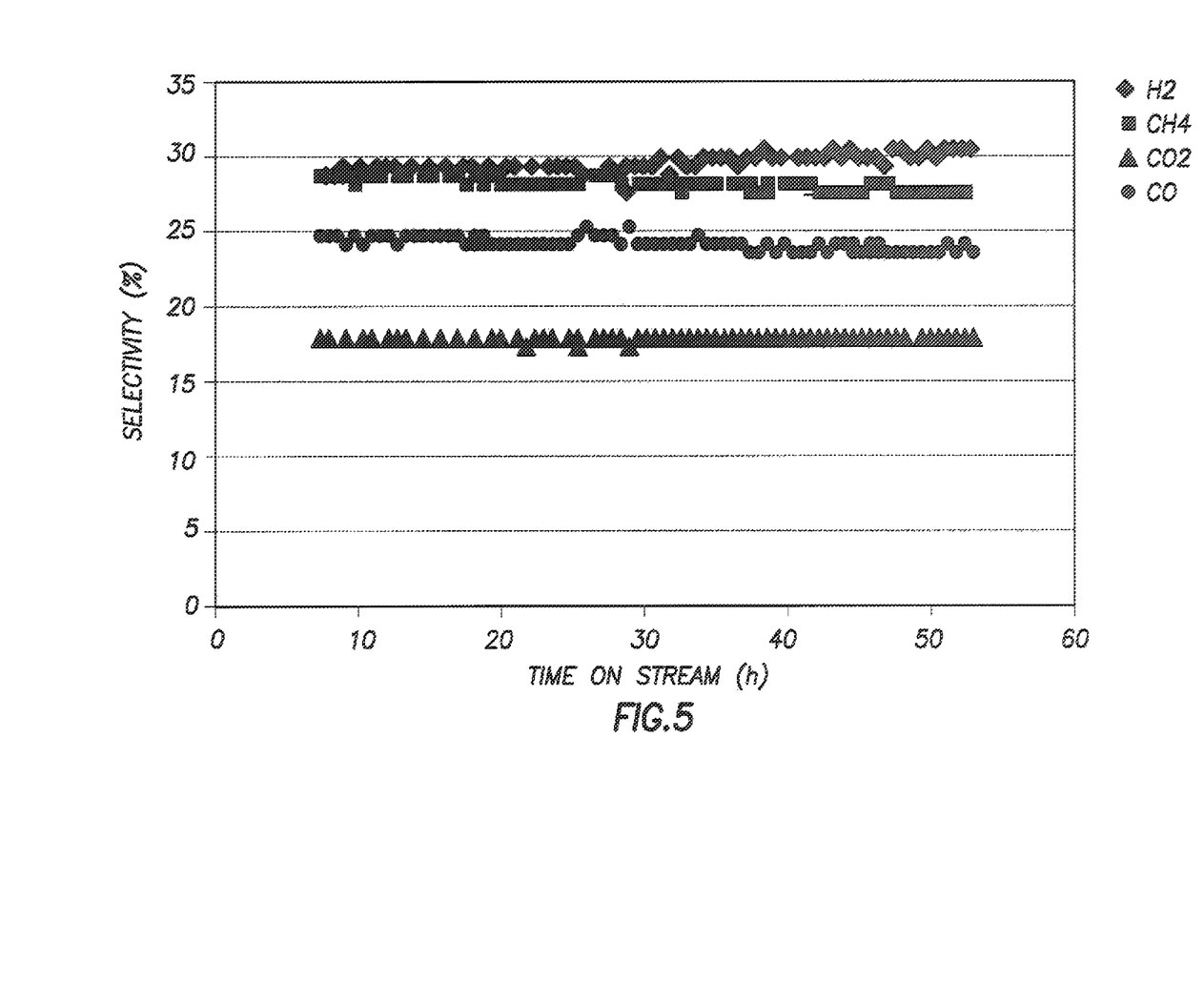
FIG. 5 depicts a snap-shot of the selectivity to dominant gas-phase products during the reforming of ethanol.
Figure 6:
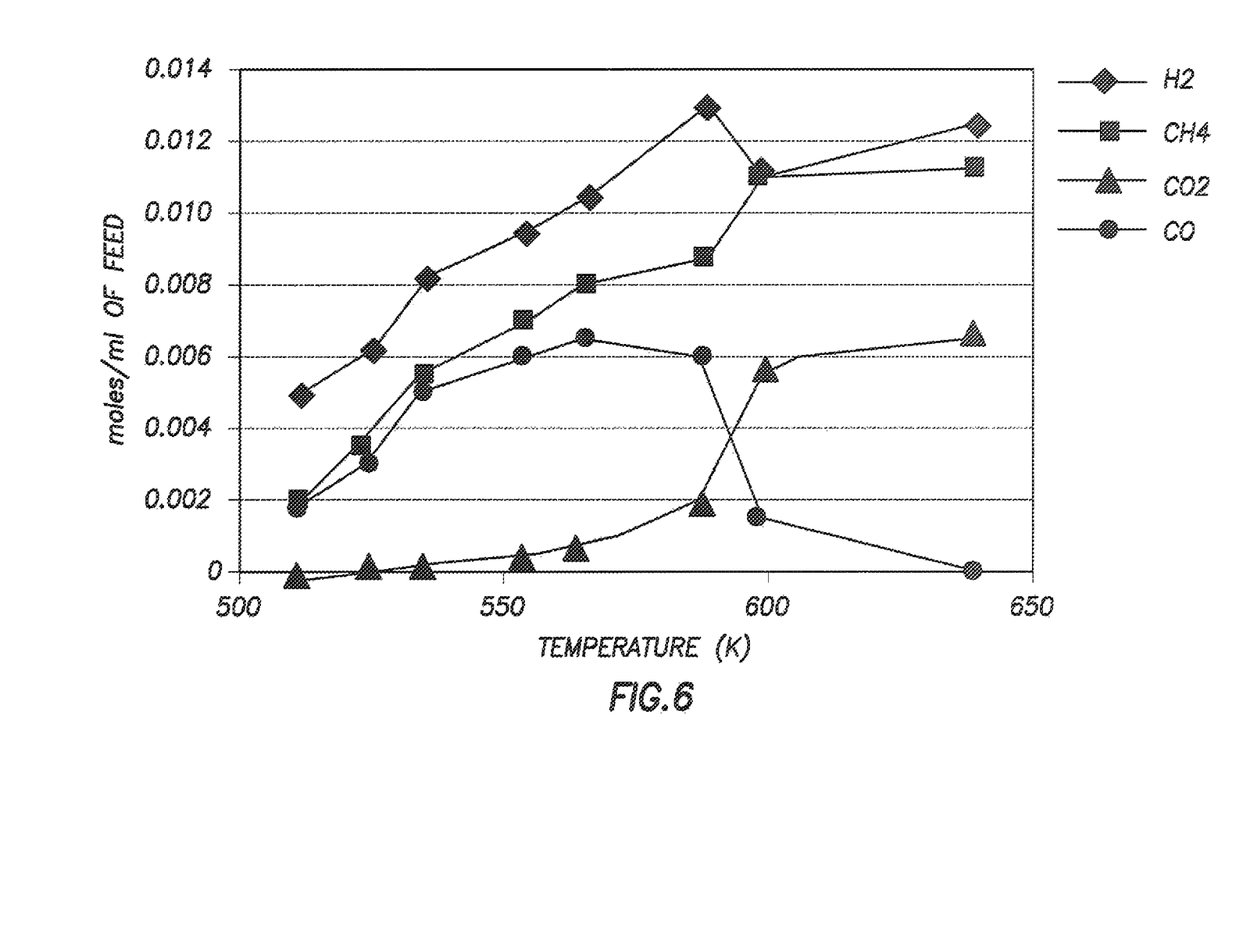
FIG. 6 depicts the species molar production rate versus temperature during catalytic reforming of ethanol.

An ethanol feed was used as the oxygenate feed and flowed over a catalyst comprising 26 wt % Ni, 10 wt % Cu, 10 wt % MgO, and 54 wt % $Al_2O_3$. The ethanol feed was able to flow over the catalyst for 7000 mL at 0.1 to 0.5 mL/min with no significant loss of activity (see FIG. 5). FIG. 6 depicts the product gas species molar flow rate versus temperature during the catalytic reforming of ethanol.

Example 2

A mixed oxygenate feed was used as the oxygenate feed and flowed over a catalyst comprising 26 wt % Ni, 10 wt % Cu, 10 wt % MgO, and 54 wt % $Al_2O_3$. Table 1 depicts the composition of the mixed oxygenate feedstock.

TABLE 1

| Component | wt % |
|---|---|
| Methanol | 61.96 |
| Water | 24.5 |
| Ethanol | 6.09 |

TABLE 1-continued

| Component | wt % |
|---|---|
| 2-Propanol | 5.05 |
| 1-Propanol | 0.77 |
| Other Oxygenates | 1.62 |
| Propylene Glycol | 0.01 |

Figure 7:
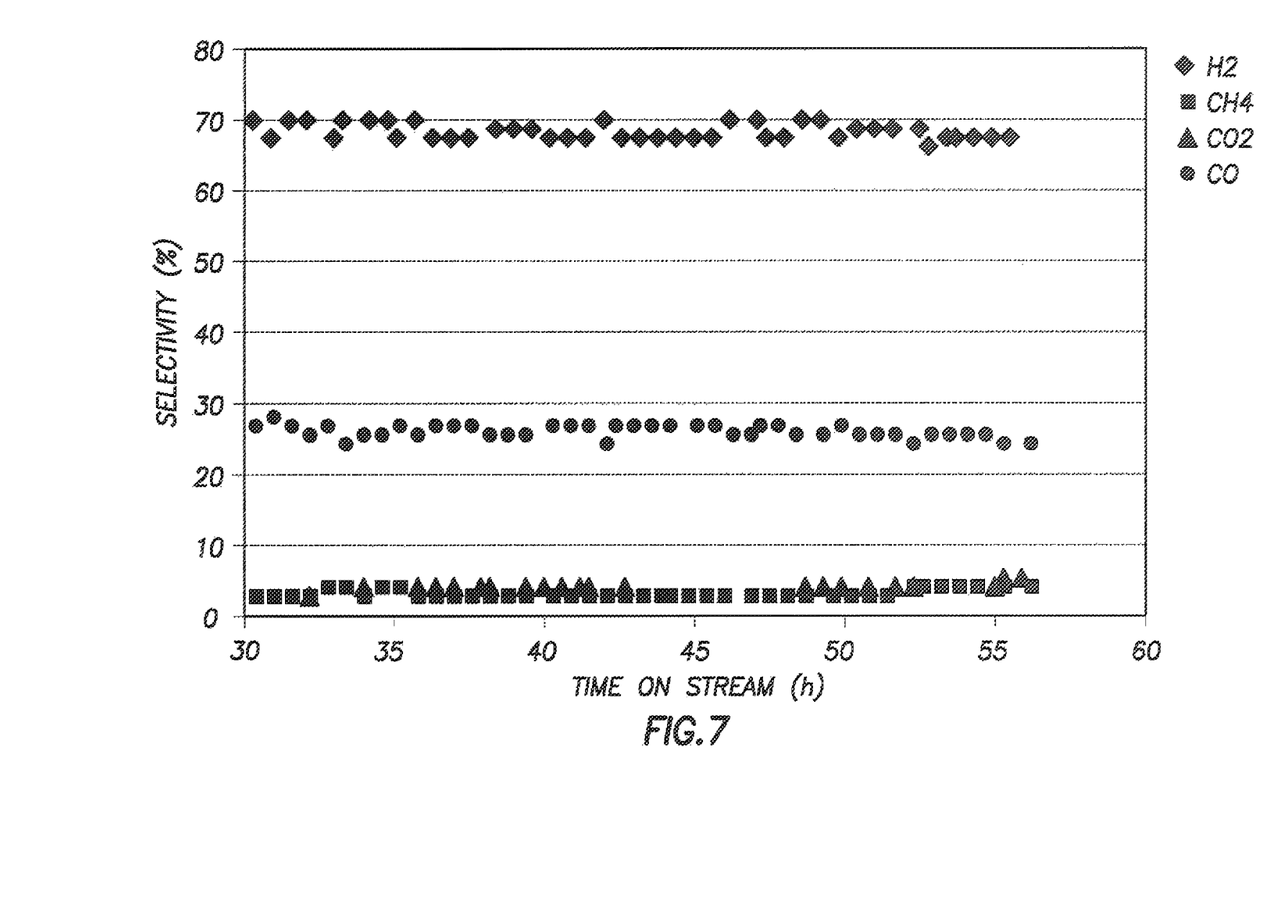
FIG. 7 depicts a snap-shot of the selectivity to dominant gas-phase products during the reforming of mixed-oxygenates.
Figure 8:
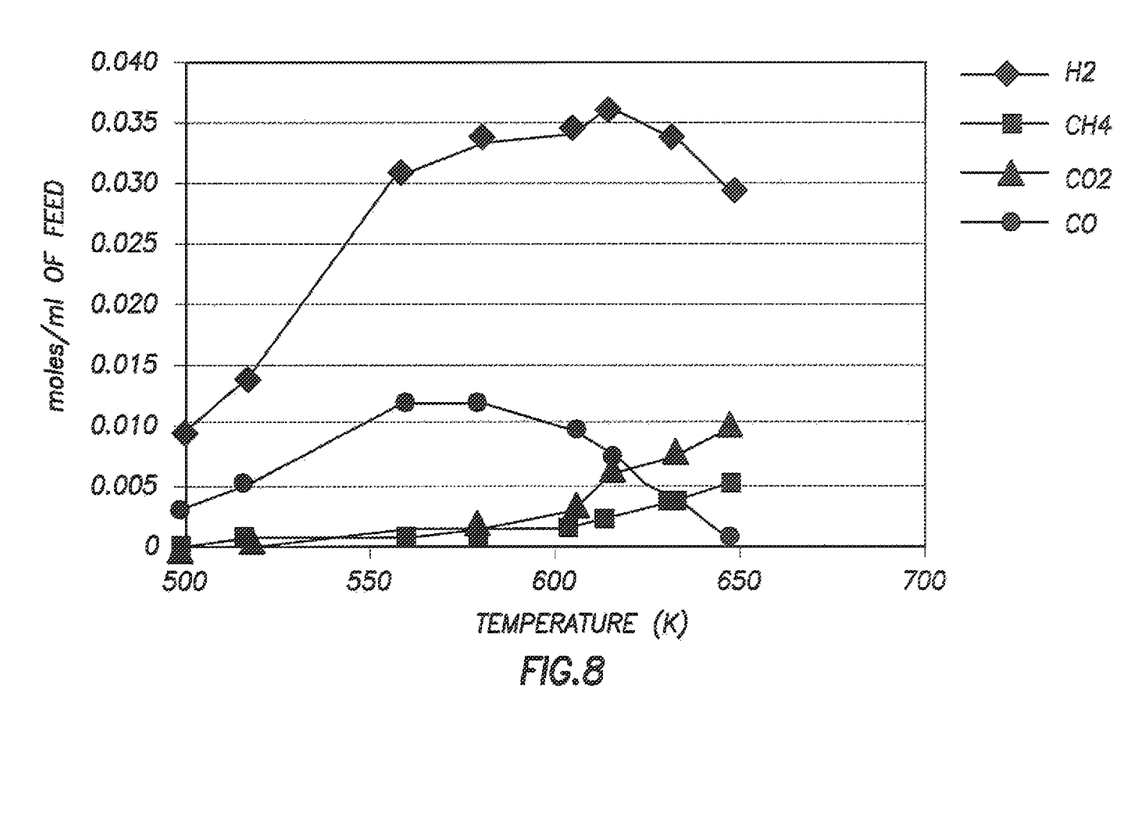
FIG. 8 depicts the species molar production rate versus temperature during catalytic reforming of mixed oxygenates.

The mixed oxygenate feed was able to flow over the catalyst for over 60 hours with no significant loss of activity (see FIG. 7). FIG. 8 depicts the product gas species molar flow rate versus temperature during the catalytic reforming of the mixed oxygenate feed.

Example 3

Figure 9:
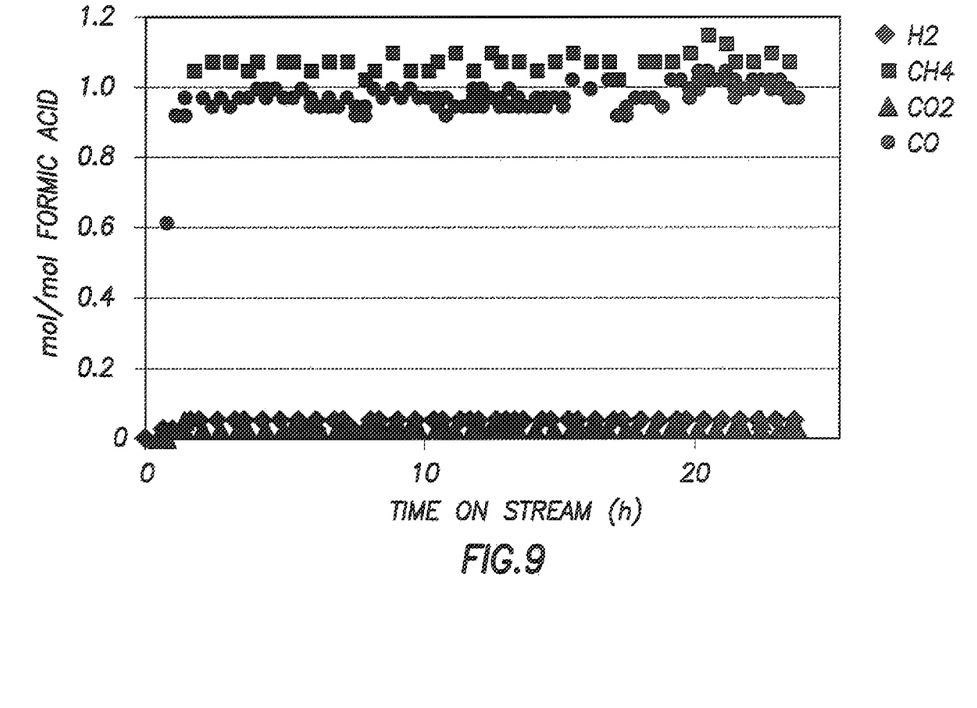
FIG. 9 depicts species yield as a function of time on stream during formic acid pre-reforming.

In this example formic acid was reformed at 100 psig and 270° C. over a catalyst comprised of 26 wt % Ni, 10 wt % Cu, 1 wt % K, 10 wt % $CeO_2$, and 53 wt % $Al_2O_3$. As shown in FIG. 9, the dominant products were hydrogen and carbon dioxide. Further, it can be inferred from FIG. 9 that there was no significant degradation in process performance since the produced amounts of hydrogen and $CO_2$ remained fairly constant over several hours of continuous operation.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process comprising:
flowing an oxygenate feed over an adiabatic fixed bed reactor, at a reaction temperature from about 200° C. to about 375° C., to produce a reactor effluent and heat;
condensing the reactor effluent to separate the liquid products and the gaseous products; and
separating the gaseous products into hydrogen and off-gas;
wherein the adiabatic fixed bed reactor comprises a metal catalyst comprising x % Ni, y % Cu, z % Fe, xx % K, yy % MgO, zz % $CeO_2$ and: XXX % $Al_2O_3$ wherein x ranges from 0 to 30 wt %, y ranges from 0 to 20 wt %; z ranges from 0 to 20 wt %; xx ranges from 0 to 20 wt %; yy ranges from 0 to 20 wt %; zz ranges from 0 to 20 wt %; and xxx ranges from 20 to 90 wt %.

2. The process of claim 1, wherein hydrogen is produced from an oxygenate feed absent the use of a steam methane reformer.

3. The process of claim 1, wherein the reaction temperature ranges from about 275° C. to about 325° C.

4. The process of claim 1, wherein the heat is used to maintain the reaction temperature inside the adiabatic fixed bed reactor.

5. The process of claim 1, wherein the liquid products are flowed back to be mixed into the oxygenate feed.

6. The process of claim 1, wherein the off-gas is used to generate heat to maintain the reaction temperature inside the adiabatic fixed bed reactor.

7. The process of claim 1, wherein the off-gas is reacted in a conventional steam methane reformer.

8. The process of claim 1, wherein a pressure swing absorber, membrane separator, or liquid solvent system is used to separate the liquid products and the gaseous products.

9. The process of claim 1, wherein the liquid products are flashed to produce a fuel gas steam.

10. The process of claim 9, wherein the fuel gas stream is combusted and used in a heat exchanger.

11. The process of claim 9, wherein the fuel gas stream is combusted and used in the adiabatic fixed bed reactor.

12. A process comprising:
mixing organic oxygenates with water to produce an oxygenate feed;
flowing the oxygenate feed over an adiabatic fixed bed reactor containing a metal catalyst, at a reaction temperature from about 275° C. to about 325° C., to produce reactor effluent and heat;
using the heat from the reaction to maintain the reaction temperature inside the adiabatic fixed bed reactor;
condensing the reactor effluent to separate the liquid products and the gaseous products;
flowing the liquid products back to be mixed into the oxygenate feed; and
separating the gaseous products into hydrogen and off-gas;
wherein the adiabatic fixed bed reactor comprises a metal catalyst comprising x % Ni, y % Cu, z % Fe, xx % K, yy % MgO, zz % $CeO_2$ and: XXX % $Al_2O_3$ wherein x ranges from 0 to 30 wt %, y ranges from 0 to 20 wt %; z ranges from 0 to 20 wt %; xx ranges from 0 to 20 wt %; yy ranges from 0 to 20 wt %; zz ranges from 0 to 20 wt %; and xxx ranges from 20 to 90 wt %.

13. The process of claim 12, wherein the off-gas is used to generate heat to maintain the reaction temperature inside the adiabatic fixed bed reactor.

14. The process of claim 12, wherein the off-gas is reacted in a conventional steam methane reformer.

15. A process comprising:
mixing organic oxygenates with water to produce an oxygenate feed;
flowing the oxygenate feed over an adiabatic fixed bed reactor containing a metal catalyst, at a temperature from about 275° C. to about 325° C., to produce reactor effluent and heat;
using the heat from the reaction to maintain the reaction temperature of the adiabatic fixed bed reactor;
condensing the reactor effluent to separate the liquid products and the gaseous products;
flashing the liquid products to produce a fuel gas stream;
utilizing the fuel gas steam to assist in the maintenance of the reaction temperature inside the adiabatic fixed bed reactor;
separating the gaseous products into hydrogen and off-gas; and
reacting a portion of the off-gas in a conventional steam methane reformer to produce more hydrogen and using a portion of the off-gas to generate heat to assist in the maintenance the reaction temperature inside the adiabatic fixed bed reactor;

wherein the adiabatic fixed bed reactor comprises a metal catalyst comprising x % Ni, y % Cu, z % Fe, xx % K, yy % MgO, zz % $CeO_2$ and: XXX % $Al_2O_3$ wherein x ranges from 0 to 30 wt %, y ranges from 0 to 20 wt %; z ranges from 0 to 20 wt %; xx ranges from 0 to 20 wt %; yy ranges from 0 to 20 wt %; zz ranges from 0 to 20 wt %; and xxx ranges from 20 to 90 wt %.

\* \* \* \* \*